US009661223B2

(12) United States Patent
Tang et al.

(10) Patent No.: US 9,661,223 B2
(45) Date of Patent: May 23, 2017

(54) METHOD AND DEVICE FOR PHOTOGRAPHING INCLUDING CAMERA SHAKE

(71) Applicant: Xiaomi Inc., Beijing (CN)

(72) Inventors: Mingyong Tang, Beijing (CN); Huayijun Liu, Beijing (CN); Tao Chen, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 14/704,943

(22) Filed: May 5, 2015

(65) Prior Publication Data

US 2016/0065852 A1    Mar. 3, 2016

Related U.S. Application Data

(63) Continuation of application No. PCT/CN2015/071310, filed on Jan. 22, 2015.

(30) Foreign Application Priority Data

Aug. 28, 2014  (CN) .......................... 2014 1 0429740

(51) Int. Cl.
*H04N 5/228*  (2006.01)
*H04N 5/232*  (2006.01)
(Continued)

(52) U.S. Cl.
CPC ......... *H04N 5/23251* (2013.01); *H04N 5/238* (2013.01); *H04N 5/2327* (2013.01);
(Continued)

(58) Field of Classification Search
CPC ........... H04N 5/23251; H04N 5/23248; H04N 5/23258; H04N 5/2327; H04N 5/2353;
(Continued)

(56) References Cited

U.S. PATENT DOCUMENTS 7,796,874 B2    9/2010  Yamamoto
2004/0119875 A1*  6/2004  Hayaishi .............. G06T 7/0002
                                                                                348/362
(Continued)

FOREIGN PATENT DOCUMENTS

CN    101180572 A    5/2008
CN    101518054 A    8/2009
(Continued)

OTHER PUBLICATIONS

"International Search Report for PCT/CN2015/071310".
"Extended European Search Report for EP15172875.5".

*Primary Examiner* — Lin Ye
*Assistant Examiner* — John H Morehead, III
(74) *Attorney, Agent, or Firm* — Jun He Law Offices P.C.; James J. Zhu

(57) ABSTRACT

The present disclosure relates to a method for photographing by a photographing device and the photographing device thereof. The method includes: determining whether camera shake is present in response to an operation of pressing a shutter of the photographing device; determining a target configuration parameter according to a current processing mode of the photographing device if camera shake is present; and adjusting the target configuration parameter. During photographing, according to the methods and devices provided in the embodiments of the present disclosure, it is determined whether camera shake is present, a target configuration parameter is determined according to a current processing mode of a photographing device if camera shake is present, and the target configuration parameter is adjusted. This prevents image blurring of photos due to camera shake, thereby improves image quality, and increases photographing success rate of the photographing device.

11 Claims, 4 Drawing Sheets

(51) Int. Cl.
   *H04N 5/235* (2006.01)
   *H04N 5/238* (2006.01)
(52) U.S. Cl.
   CPC ......... *H04N 5/2352* (2013.01); *H04N 5/2353* (2013.01); *H04N 5/23248* (2013.01); *H04N 5/23258* (2013.01); *G03B 2217/005* (2013.01)
(58) Field of Classification Search
   CPC . H04N 5/238; H04N 5/2352; G03B 2217/005
   See application file for complete search history.

(56) References Cited

U.S. PATENT DOCUMENTS

| | | | | |
|---|---|---|---|---|
| 2004/0240867 | A1* | 12/2004 | Hara | G03B 17/00 396/55 |
| 2005/0062852 | A1* | 3/2005 | Yamazaki | H04N 5/23248 348/208.6 |
| 2006/0051081 | A1* | 3/2006 | Ogino | G03B 5/02 396/55 |
| 2006/0077458 | A1* | 4/2006 | Miyazaki | H04N 1/00132 358/1.15 |
| 2006/0140599 | A1* | 6/2006 | Nomura | H04N 5/23248 396/52 |
| 2006/0170781 | A1* | 8/2006 | Sobol | H04N 5/23248 348/208.4 |
| 2007/0009245 | A1 | 1/2007 | Ito | |
| 2007/0206941 | A1 | 9/2007 | Maruyama et al. | |
| 2009/0225202 | A1* | 9/2009 | Hata | H04N 5/23293 348/241 |
| 2009/0231450 | A1* | 9/2009 | Tanaka | G03B 5/02 348/208.7 |
| 2009/0290859 | A1* | 11/2009 | Soga | G03B 5/00 396/55 |
| 2009/0310013 | A1* | 12/2009 | Odaka | G03B 15/03 348/371 |
| 2010/0149352 | A1* | 6/2010 | Jang | H04N 5/23248 348/208.11 |
| 2010/0232774 | A1 | 9/2010 | Lee | |
| 2011/0063458 | A1* | 3/2011 | Washisu | G03B 5/00 348/208.2 |
| 2011/0122278 | A1* | 5/2011 | Choi | H04N 5/353 348/222.1 |
| 2012/0108292 | A1 | 5/2012 | Zhong et al. | |
| 2012/0113280 | A1 | 5/2012 | Stupak et al. | |
| 2014/0354834 | A1* | 12/2014 | Narita | H04N 5/23287 348/208.4 |
| 2016/0044246 | A1* | 2/2016 | Yamada | H04N 5/23212 348/349 |

FOREIGN PATENT DOCUMENTS

| | | |
|---|---|---|
| CN | 101729665 A | 6/2010 |
| CN | 102262337 A | 11/2011 |
| CN | 102457675 A | 5/2012 |
| CN | 102523380 A | 6/2012 |
| CN | 103051841 A | 4/2013 |
| CN | 103813103 A | 5/2014 |
| CN | 103841324 A | 6/2014 |
| CN | 104219448 A | 12/2014 |
| JP | 2001042379 A | 2/2001 |
| JP | 2001305417 A | 10/2001 |
| JP | 2002287195 A | 10/2002 |
| JP | 2006332809 A | 12/2006 |
| JP | 2007019973 A | 1/2007 |
| JP | 2009244490 A | 10/2009 |
| JP | 2009246962 A | 10/2009 |
| KR | 1020130010277 A | 1/2013 |

* cited by examiner

METHOD AND DEVICE FOR PHOTOGRAPHING INCLUDING CAMERA SHAKE

CROSS-REFERENCE TO RELATED APPLICATIONS

This application is a Continuation Application of International Application No. PCT/CN2015/071310 with an international filing date of Jan. 22, 2015, which is based upon and claims priority to Chinese Patent Application No. CN201410429740.7, filed on Aug. 28, 2014, the entire contents of which are incorporated herein by reference.

TECHNICAL FIELD

The present disclosure relates to the field of image processing, and more particularly, relates to a method and an device for photographing.

BACKGROUND

In daily life, many users will use cameras to take photos, but as the need for beautification of photos increases, the users will be more concerned about the quality of the photos.

SUMMARY

According to a first aspect of embodiments of the present disclosure, a method for photographing by a photographing device is provided. The method includes: determining whether camera shake is present in response to an operation of pressing a shutter of the photographing device; determining a target configuration parameter according to a current processing mode of the photographing device if camera shake is present; and adjusting the target configuration parameter.

According to a second aspect of embodiments of the present disclosure, a photographing device is provided. The photographing device includes: one or more processors; and a memory configured to store instructions executable by the processor, wherein the processors are configured to perform: determining whether camera shake is present in response to an operation of pressing a shutter of the photographing device; determining a target configuration parameter according to a current processing mode of the photographing device if camera shake is present; and adjusting the target configuration parameter.

According to a third aspect of embodiments of the present disclosure, a non-transitory computer-readable storage medium is provided. The non-transitory computer-readable storage medium have stored therein instructions that, when executed by one or more processors of a photographing device, cause the photographing device to perform: determining whether camera shake is present in response to an operation of pressing a shutter of the photographing device; determining a target configuration parameter according to a current processing mode of the photographing device if camera shake is present; and adjusting the target configuration parameter.

The technical solutions provided in the embodiments of the present disclosure may achieve the following beneficial effects:

During photographing, according to the methods and devices provided in the embodiments of the present disclosure, it is determined whether camera shake is present, a target configuration parameter is determined according to a current processing mode of a photographing device if camera shake is present, and the target configuration parameter is adjusted. This prevents image blurring of photos due to camera shake, thereby improves image quality, and increases photographing success rate of the photographing device.

It shall be appreciated that the above general description and the detailed description hereinafter are only illustrative but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure.

DESCRIPTION OF THE EMBODIMENTS

To make the objectives, technical solutions, and advantages of the present disclosure clearer, the present disclosure is described hereinafter in detail with reference to exemplary embodiments and attached drawings. Herein, the exemplary embodiments of the present disclosure and descriptions thereof are intended to interpret and illustrate the present disclosure, but are not intended to limit the present disclosure.

Embodiments of the present disclosure provide a method and device for photographing. The present disclosure is described in detail with reference to attached drawings.

Figure 1:
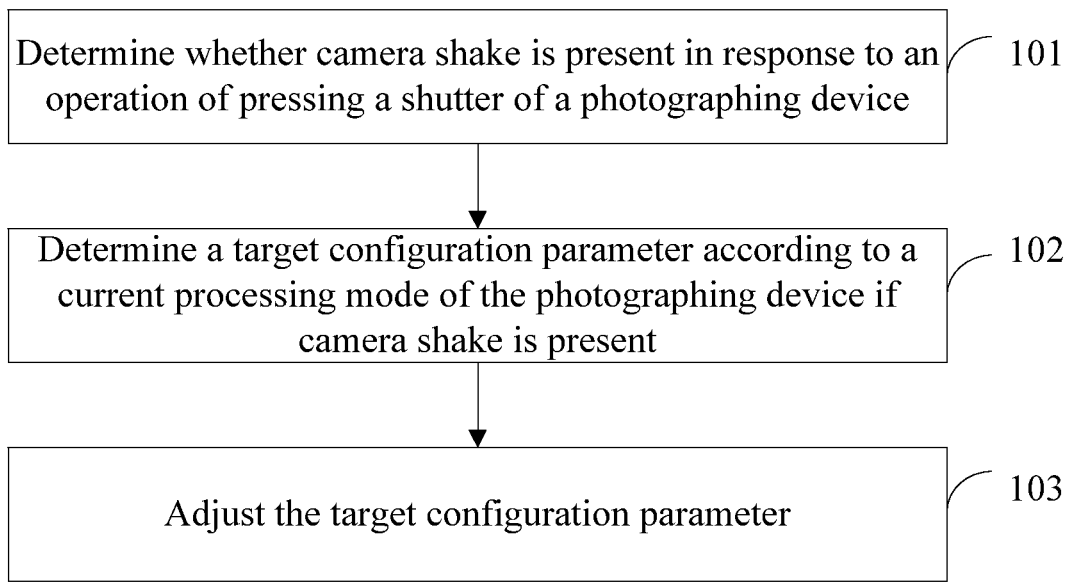
FIG. 1 is a flowchart illustrating a method for photographing according to an exemplary embodiment of the present disclosure.

FIG. 1 is a flowchart illustrating a method for photographing according to an exemplary embodiment of the present disclosure. As illustrated in FIG. 1, the photographing method is applicable to a photographing device, and includes the following steps.

In step 101, it is determined whether camera shake is present in response to an operation of pressing a shutter of a photographing device.

In step 102, a target configuration parameter is determined according to a current processing mode of the photographing device if camera shake is present.

In step 103, the target configuration parameter is adjusted.

During photographing, according to the method provided in this embodiment, it is determined whether camera shake is present, a target configuration parameter is determined according to a current processing mode of a photographing device if camera shake is present, and the target configuration parameter is adjusted. This prevents image blurring of the photos due to camera shake of the photographing device, improves image quality, and increase photographing success rate of the photographing device.

Determining the target configuration parameter according to the current processing mode of the photographing device includes, if an automatic stabilization function is not enabled, determining that the target configuration parameter is a parameter of the automatic stabilization function. And correspondingly, adjusting the target configuration parameter includes enabling the automatic stabilization function.

Determining the target configuration parameter according to the current processing mode of the photographing device includes, if an automatic stabilization function is enabled, determining that the target configuration parameter includes at least one of shutter speed, photosensitivity, and aperture value. And correspondingly, adjusting the target configuration parameter includes at least one of reducing the shutter speed to a predetermined shutter speed, improving the photosensitivity to a predetermined photosensitivity and reducing the aperture value to a predetermined aperture value.

Determining the target configuration parameter according to the current processing mode of the photographing device if camera shake is present includes: displaying an optimization prompt message used for prompting whether to make an optimization if camera shake is present; and determining the target configuration parameter according to the processing mode when a confirmation operation in response to the optimization prompt message is detected.

Determining whether camera shake is present in response to the operation of pressing the shutter of the photographing device includes: acquiring a camera shake amplitude of the photographing device via a configured sensor in response to the operation of pressing the shutter of the photographing device; determining whether the camera shake amplitude is greater than a predetermined amplitude; and determining that camera shake is present when the camera shake amplitude is greater than the predetermined amplitude.

Determining whether camera shake is present in response to the operation of pressing the shutter of the photographing device includes: acquiring a current shutter speed and a current focus of the photographing device in response to the operation of pressing the shutter of the photographing device; determining whether the shutter speed is greater than the reciprocal of the focus; and determining that camera shake is present when the shutter speed is greater than the reciprocal of the focus.

Determining whether camera shake is present in response to the operation of pressing the shutter of the photographing device includes: acquiring an acutance of a focus area in response to the operation of pressing the shutter of the photographing device; determining whether the acutance is less than a predetermined acutance; and determining that camera shake is present when the acutance is less than the predetermined acutance.

The above optional technical solutions may be combined in any form to construct an optional embodiment of the present disclosure, which is not described herein any further.

Figure 2:
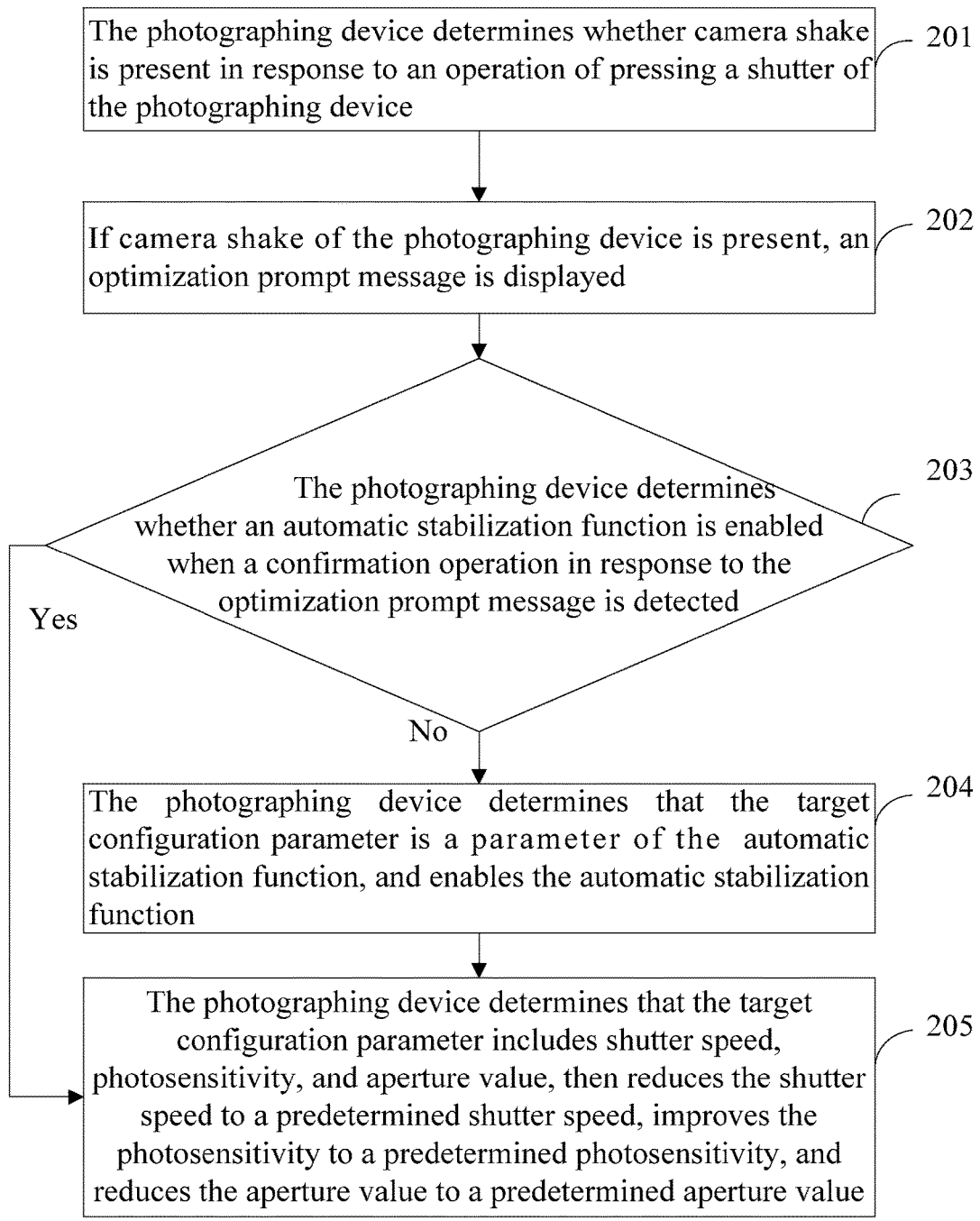
FIG. 2 is a flowchart illustrating a method for photographing according to an exemplary embodiment of the present disclosure.

FIG. 2 is a flowchart illustrating a method for photographing according to an exemplary embodiment of the present disclosure. As illustrated in FIG. 2, the photographing method is applicable to a photographing device, and includes the following steps.

In step 201, the photographing device determines whether camera shake is present in response to an operation of pressing a shutter of the photographing device.

The photographing device is used to capture photos. When a user presses the shutter of the photographing device, the photographing device is capable of capturing photos. The photographing device may be a digital camera, a single lens reflex camera, or the like, or may be a mobile phone, a tablet or the like equipped with a camera, which is not limited in this embodiment.

In this embodiment, to ensure quality of the photos, when the photographing device acquires the operation of pressing the shutter of the photographing device, the photographing device not only capture photos, but also determine whether camera shake of the photographing device is present. If camera shake of the photographing device is present, it indicates that the photo captured is subjected to poor quality and the photographing device needs to be optimized, such that subsequently, the photographing device is capable of capturing photos of high quality.

Step 201 may include at least one of steps 201a to 201c.

In step 201a, in response to an operation of pressing the shutter of the photographing device, a camera shake amplitude of the photographing device is acquired through a configured sensor; it is determined whether the camera shake amplitude is greater than a predetermined amplitude; and it is determined that camera shake is present when the camera shake amplitude is greater than the predetermined amplitude.

The photographing device is equipped with a sensor, wherein the sensor is configured to acquire a camera shake amplitude of the photographing device, and may be a gravity sensor or the like. The sensor may acquire, in real time, camera shake amplitudes of the photographing device in various directions, for example, a camera shake amplitude of the photographing device in a vertical direction, a camera shake amplitude of the photographing device in a horizontal direction, or the like. The photographing device may directly use the camera shake amplitude of the photographing device in the vertical direction as the camera shake amplitude of the photographing device, or may use the sum of the camera shake amplitudes of the photographing device in various directions as the camera shake amplitude of the photographing device, which is not limited in this embodiment.

In response to the operation of pressing the shutter of the photographing device, the photographing device determines the camera shake amplitude acquired by the sensor, and determines whether the camera shake amplitude is greater than the predetermined amplitude. If the camera shake amplitude is greater than the predetermined amplitude, it is determined that camera shake of the photographing device is present. If the camera shake amplitude is not greater than the predetermined amplitude, it is determined that camera shake of the photographing device is not present.

The photographing device may predefine the predetermined amplitude. When the camera shake amplitude of the photographing device is greater than the predetermined amplitude, it may be considered that camera shake of the photographing device is present; and when the camera shake amplitude is less than the predetermined amplitude, it may be considered that camera shake of the photographing is not present. The predetermined amplitude may be defined according to the desired photo quality, which is not limited in this embodiment.

In step 201b, in response to the operation of pressing the shutter of the photographing device, a current shutter speed and a current focus of the photographing device are acquired, and it is determined whether the shutter speed is greater than the reciprocal of the focus; and it is determined that camera shake is present if the shutter speed is greater than the reciprocal of the focus.

When the shutter speed of the photographing device is too large, the slower the shutter speed is, camera shake of the photographing device may be more directly reflected in the photo, and as a result the image of the photo captured is blurred. The quality of the photo captured may be ensured only when the shutter speed of the photographing device is less than a secure shutter speed. In addition, the longer the focus of the lens is, the higher the possibility that the image of the photo is blurred is. In this case, clarity of the image of the photo may be ensured only when the shutter speed is reduced. Therefore, the secure shutter speed may be less than the reciprocal of the focus of the photographing device. For example, when the focus is 50 mm, the shutter speed shall be less than 1/50 s, such that the image of the photo may be ensured to be clear.

Based on the above circumstances, in response to the operation of pressing the shutter of the photographing device, the photographing device acquires the current shutter speed and the current focus of the photographing device, and determines whether the shutter speed is greater than the reciprocal of the focus. When the shutter speed is greater than the reciprocal of the focus, it indicates that the possibility that camera shake of the photographing device is present is high, and it may be determined that camera shake of the photographing device is present, such that the photographing device is to be optimized. When the shutter speed is not greater than the reciprocal of the focus, it indicates that the possibility that camera shake of the photographing device is present is low, and it may be determined that camera shake of the photographing device is not present.

In step 201c, in response to the operation of pressing the shutter of the photographing device, an acutance of a focus area is acquired, and it is determined whether the acutance is less than a predetermined acutance; and it is determined that camera shake is present when the acutance is less than the predetermined acutance.

The acutance of a photo is used to reflect clarity of the photo and edge sharpness of the photo. The higher the acutance is, the clearer the image of the photo is; and the lower the acutance is, the more blurred the image of the photo is. Accordingly, in response to the operation of pressing the shutter of the photographing device, the photographing device acquires an acutance of a focus area, and determines whether the acutance is less than a predetermined acutance. When the acutance is less than the predetermined acutance, the photographing device determines that the focus area of the photo is blurred or subjected to double images, and it is determined that camera shake of the photographing device is present. When the camera shake amplitude is not greater than the predetermined amplitude, the photographing device determines that the image of the photo is clear, and it is determined that camera shake of the photographing device is not present. The photographing device may predefine the predetermined acutance according to the requirements on clarity of the image of the photo, which is not limited in this embodiment.

It shall be noted that the above steps 201a to 201c give three conditions to determine whether camera shake of the photographing device is present. When the photographing device determines that any one of the above three conditions is satisfied, it may be determined that camera shake is present; or when the photographing device determines any two of the above three conditions are concurrently satisfied, it may be determined that camera shake is present; or when the photographing device determines that the above three conditions are concurrently satisfied, it can be determined that camera shake is present. This embodiment sets no limitation thereto. Nevertheless, the photographing device may also determine whether camera shake of the photographing device is present by using other conditions, which is not limited in this embodiment either.

In step 202, if camera shake of the photographing device is present, an optimization prompt message is displayed.

When determining that camera shake is present, the photographing device may firstly display an optimization prompt message to prompt the user whether to make an optimization to the photographing device, for example, a prompt message "Camera shake is present when capturing photos; do you want to optimize the camera" is displayed. The photographing device may provide an OK option or an Ignore option in response to the optimization prompt message. When the user desires to optimize the photographing device, the user may click the OK option, and then the photographing device detects the confirmation operation performed by the user in response to the optimization prompt message and starts the optimization. When the user does not desire to optimize the photographing device, the user may click the Ignore option, and then the photographing device detects the ignore operation performed by the user in response to the optimization prompt message and does not perform any optimization operation.

It shall be noted that the photographing device may not perform step 202, and instead the photographing device is directly optimized. Whether the photographing device performs step 202 may be defined by the photographing device by default or may be defined by the user during use of the photographing device, which is not limited in this embodiment.

In step 203, when detecting a confirmation operation in response to the optimization prompt message, the photographing device determine whether an automatic stabilization function is enabled; if the automatic stabilization function is enabled, step 205 is to be performed; and otherwise, step 204 is to be performed.

When the photographing device detects the confirmation operation in response to the optimization prompt message, the photographing device is optimized. During the optimization process, the photographing device determines a target configuration parameter according to a current processing mode of the photographing device, and then adjusts the target configuration parameter, such that clarity of the photo is ensured and the photo quality is improved.

If the automatic stabilization function is configured for the photographing device, the current processing mode of the photographing device includes: automatic stabilization function enabled and automatic stabilization function disabled. Since the automatic stabilization function prevents camera shake and improves the photo quality, during optimization, the photographing device may firstly determine whether the automatic stabilization function is enabled. If the automatic stabilization function is not enabled, the photographing device determines that the target configuration parameter is a parameter of the automatic stabilization function, and then enables the automatic stabilization function.

It shall be noted that the photographing device may employ multiple processing modes during photographing, and each of the processing modes corresponds to at least one configuration parameter. In this case, the photographing device may determine a target configuration parameter to be adjusted according to the current processing mode, and then adjust the target configuration parameter.

In step 204, the photographing device determines that the target configuration parameter is the parameter of the automatic stabilization function, and enables the automatic stabilization function.

In step 205, when determining that the target configuration parameter includes shutter speed, photosensitivity, and aperture value, the photographing device reduces the shutter speed to a predetermined shutter speed, improves the photosensitivity to a predetermined photosensitivity, and reduces the aperture value to a predetermined aperture value.

If the automatic stabilization function is enabled, the photographing device may also determine that the target configuration parameter includes at least one of shutter speed, photosensitivity, and aperture value, and in this case, optimization is continued.

A person skilled in the art may know that under the same illumination, when the photosensitivity is constant, the aperture value and the shutter speed are subject to the following relationship: the less the aperture value is, the larger the aperture is, and the faster the shutter is, the smaller the shutter speed is; the greater the aperture value is, the smaller the aperture is, and the slower the shutter is, the greater the shutter speed is. When the aperture value is constant, the photosensitivity and the shutter speed are subject to the following relationship: the higher the photosensitivity is, the faster the shutter is, i.e., the smaller the shutter speed is; the lower the photosensitivity is, the slower the shutter is, i.e., the greater the shutter speed is. In addition, when the photosensitivity is improved, the photo captured may be subjected to noises. To reduce the noises, the aperture value may be suitably reduced to enlarge the aperture.

The photographing device may directly reduce the shutter speed to a predetermined shutter speed, or may improve the photosensitivity to a predetermined photosensitivity, reduce the aperture value to a predetermined aperture value. The predetermined photosensitivity and the predetermined aperture value may be predefined by the photographing device. For example, the predetermined photosensitivity may be predefined to 3200 or 6400, which is not limited in this embodiment.

This embodiment is described using the scenario, where the photographing device determines that the target configuration parameter is the shutter speed, photosensitivity, and aperture value, as an example. In practice, the photographing device may only determine that the target configuration parameter is the shutter speed, and in this case, the photographing device reduces the shutter speed to the predetermined shutter speed. Or, the photographing device may only determine that the target configuration parameter is the photosensitivity, and in this case, the photographing device improves the photosensitivity to the predetermined photosensitivity. Or, the photographing device may only determine that the target configuration parameter is the aperture value, and in this case, the photographing device reduces the aperture value to the predetermined aperture value. This embodiment sets no limitation to the target configuration parameter and the manner of adjusting the target configuration parameter.

In addition, the photographing device is described only using the scenario, where the shutter speed is reduced to the predetermined shutter speed, the photosensitivity is improved to the predetermined photosensitivity, or the aperture value is reduced to the predetermined aperture value, as an example. In practice, the photographing device may predefine an adjustment amplitude of the shutter speed, an adjustment amplitude of the photosensitivity, and an adjustment amplitude of the aperture value. Each time optimization is performed, the photographing device may reduce the shutter speed according to the adjustment amplitude of the shutter speed, improve the photosensitivity according to the adjustment amplitude of the photosensitivity, or reduce the aperture value according to the adjustment amplitude of the aperture value. For example, when the shutter speed is defined as one mode at an interval of $1/1000$ s, if the current shutter speed is $1/2000$ s, the shutter speed may be reduced to $1/3000$ s.

In the subsequent photographing, if it is determined that camera device of the photographing device is present, the shutter speed, the photosensitivity, and the aperture value may be further adjusted according to the adjustment amplitude of the shutter speed, the adjustment amplitude of the photosensitivity, and the adjustment amplitude of the aperture value.

It shall be noted that during optimization of the photographing device, the target configuration parameter and the adjustment manner thereof, and the effect achieved by adjusting the target configuration parameter may be displayed, such that the user may know how to optimize the photographing device, and know the effect and function of the target configuration parameter.

During photographing, according to the method provided in this embodiment, it is determined whether camera shake is present, a target configuration parameter is determined according to the current processing mode of a photographing device if camera shake is present, and the target configuration parameter is adjusted. This prevents image blurring of the photo due to camera shake of the photographing device, improves photograph quality, and increase photographing success rate of the photographing device.

Figure 3:
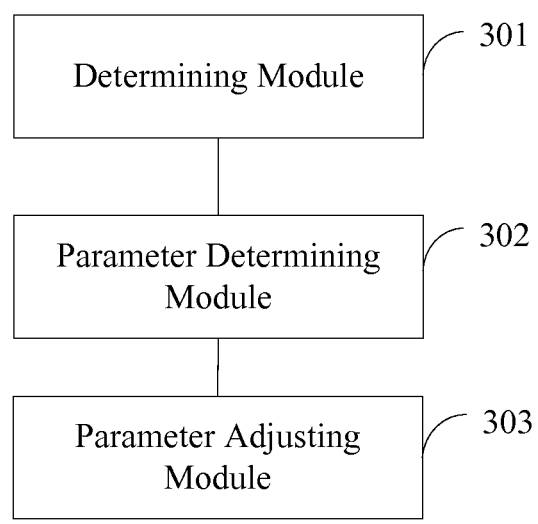
FIG. 3 is a block diagram illustrating a apparatus for photographing according to an exemplary embodiment of the present disclosure.

FIG. 3 is a block diagram illustrating a photographing apparatus according to an exemplary embodiment of the present disclosure. Referring to FIG. 3, the apparatus includes: a determining module 301, a parameter determining module 302, and a parameter adjusting module 303.

The determining module 301 is configured to determine whether camera shake is present in response to an operation of pressing a shutter of a photographing device.

The parameter determining module 302 is configured to determine a target configuration parameter according to a current processing mode of the photographing device if camera shake is present.

The parameter adjusting module 303 is configured to adjust the target configuration parameter.

During photographing, according to the apparatus provided in this embodiment, it is determined whether camera shake is present, a target configuration parameter is determined according to a current processing mode of a photographing device if camera shake is present, and the target configuration parameter is adjusted. This prevents image blurring of the photo due to camera shake of the photographing device, improves photograph quality, and increase photographing success rate of the photographing device.

The parameter determining module 302 is configured to, if an automatic stabilization function is not enabled, determine that the target configuration parameter is a parameter of the automatic stabilization function.

Correspondingly, the parameter adjusting module 303 is configured to enable the automatic stabilization function.

The parameter determining module 302 is configured to, if an automatic stabilization function is enabled, determine that the target configuration parameter includes at least one of shutter speed, photosensitivity, and aperture value.

Correspondingly, the parameter adjusting module 303 is configured to reduce the shutter speed to a predetermined shutter speed. The parameter adjusting module 303 is further configured to improve the photosensitivity to a predetermined photosensitivity. The parameter adjusting module 303 is further configured to reduce the aperture value to a predetermined aperture value.

The parameter determining module 302 includes: a prompt message displaying unit, configured to display an optimization prompt message if camera shake is present, the optimization prompt message being used for prompting whether to make an optimization; and a confirming unit, configured to determine the target configuration parameter according to the processing mode when a confirmation operation in response to the optimization prompt message is detected.

The determining module 301 includes: a first acquiring unit, configured to acquire a camera shake amplitude of the photographing device via a configured sensor in response to the operation of pressing the shutter of the photographing device; a first judging unit, configured to determine whether the camera shake amplitude is greater than a predetermined amplitude; and a first determining unit, configured to determine that camera shake is present when the camera shake amplitude is greater than the predetermined amplitude.

The determining module 301 includes: a second acquiring unit, configured to acquire a current shutter speed and a current focus of the photographing device in response to the operation of pressing the shutter of the photographing device; a second judging unit, configured to determine whether the shutter speed is greater than the reciprocal of the focus; and a second determining unit, configured to determine that camera shake is present when the shutter speed is greater than the reciprocal of the focus.

The determining module 301 includes: a third acquiring unit, configured to acquire an acutance of a focus area in response to the operation of pressing the shutter of the photographing device; a third judging unit, configured to determine whether the acutance is less than a predetermined acutance; and a third determining unit, configured to determine that camera shake is present when the acutance is less than the predetermined acutance.

The above optional technical solutions may be combined in any form to construct an optional embodiment of the present disclosure, which is not described herein any further.

With respect to the apparatuses in the above embodiment, the specific implementations of operations executed by various modules thereof have been described in detail in the embodiments illustrating the methods, which are not described herein any further.

It shall be noted that, during photographing by the photographing devices according to the above embodiments, the devices are described by only using division of the above functional modules as examples. In practice, the functions may be assigned to different functional modules for implementation as required. To be specific, the internal structure of the photographing device is divided into different functional modules to implement all or part of the above-described functions. In addition, the photographing apparatuses according to the above embodiments are based on the same inventive concept as the photographing methods according to the embodiments of the present disclosure. The specific implementation is elaborated in the method embodiments, which is not described herein any further.

Figure 4:
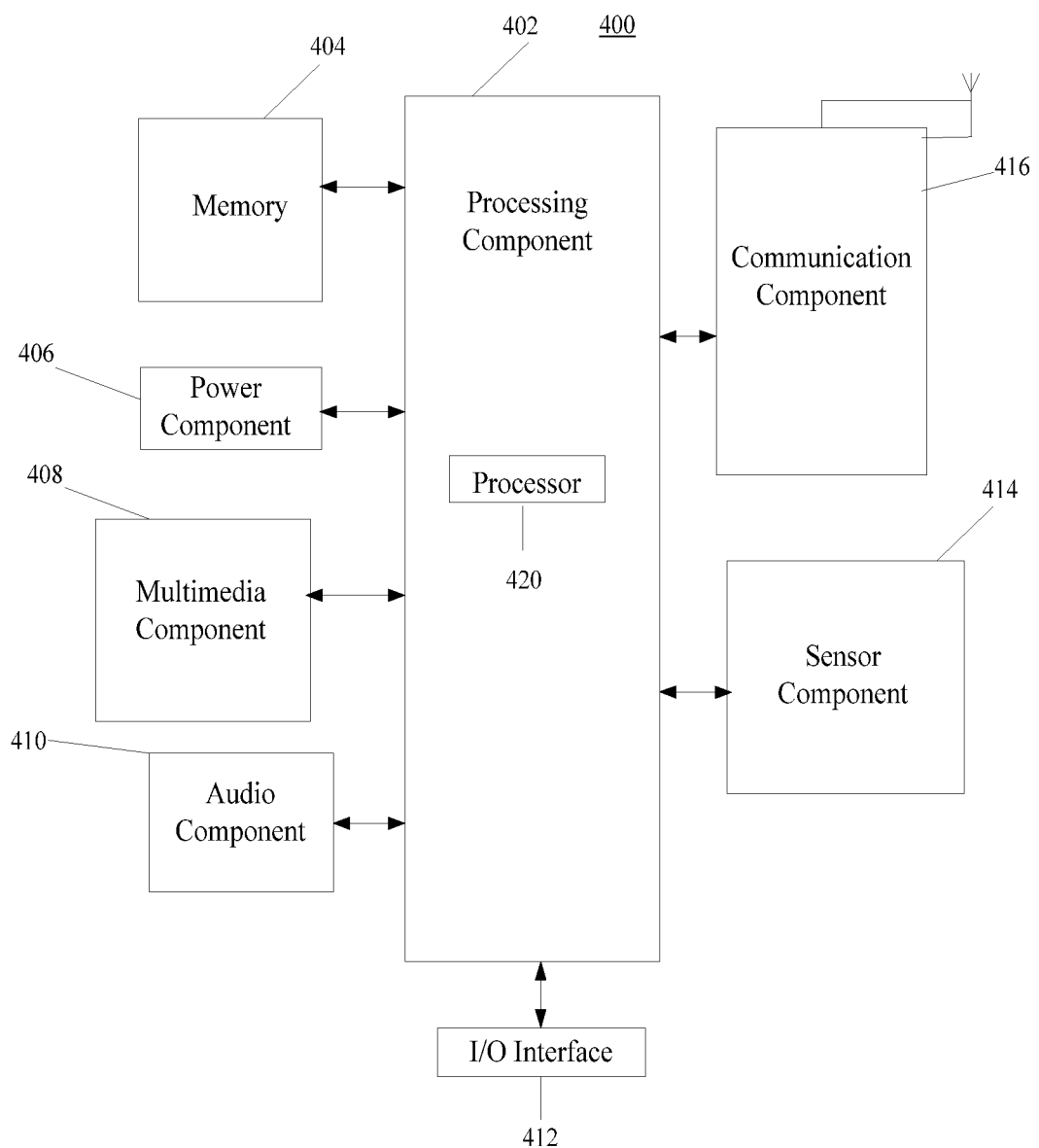
FIG. 4 is a block diagram illustrating a device for use in photographing according to an exemplary embodiment of the present disclosure.

FIG. 4 is a block diagram illustrating a device 400 for use in photographing (namely, a photographing device) according to an exemplary embodiment of the present disclosure. For example, the device 400 may be a mobile phone, a computer, a tablet, a medical device, an exercise equipment, and the like.

Referring to FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or a part of the steps in the above-described methods. In addition, the processing component 402 may include one or more modules which facilitate the interaction between the processing component 402 and other components. For example, the processing component 402 may include a multimedia module to facilitate the interaction between the multimedia component 408 and the processing component 402.

The memory 404 is configured to store various types of data to support the operations of the device 400. Examples of such data include instructions for any application or method operated on the device 400, contact data, phonebook data, messages, pictures, videos, and the like. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power supplies, and other components associated with the generation, management, and distribution of power in the device 400.

The multimedia component 408 includes a screen providing an output interface between the device 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. The multimedia component 408 includes a front camera and/or a rear camera. The front camera and/or the rear camera may receive external multimedia data while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone (MIC) configured to receive an external audio signal when the device 400 is in an operation mode, such as a call mode, a recording mode, or a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and a peripheral interface module, such as a keyboard, a click wheel, a button, or the like.

The buttons may include, but are not limited to, a home button, a volume button, a starting button, and a locking button.

The sensor component 414 includes one or more sensors to provide status assessments of various aspects of the device 400. For example, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communications, wired or wirelessly, between the device 400 and other devices. The device 400 may access a wireless network based on a communication standard, such as WiFi, 2G, or 3G, or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 404, executable by the processor 420 in the device 400, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

A non-transitory computer-readable storage medium is provided. When instructions stored in the storage medium are executed by a processor of a photographing device, the photographing device is caused to perform a photographing method, wherein the method includes: determining whether camera shake is present in response to an operation of pressing a shutter of a photographing device; determining a target configuration parameter according to a current processing mode of the photographing device if camera shake is present; and adjusting the target configuration parameter.

Determining the target configuration parameter according to the current processing mode of the photographing device includes, if an automatic stabilization function is not enabled, determining that the target configuration parameter is a parameter of the automatic stabilization function. And correspondingly adjusting the target configuration parameter includes enabling the automatic stabilization function.

Determining the target configuration parameter according to the current processing mode of the photographing device includes, if an automatic stabilization function is enabled, determining that the target configuration parameter includes at least one of shutter speed, photosensitivity, and aperture value. And correspondingly, adjusting the target configuration parameter includes at least one of the following: reducing the shutter speed to a predetermined shutter speed; improving the photosensitivity to a predetermined photosensitivity; and reducing the aperture value to a predetermined aperture value.

Determining a target configuration parameter according to the current processing mode of the photographing device if camera shake is present includes displaying an optimization prompt message used for prompting whether to make an optimization if camera shake is present and determining the target configuration parameter according to the processing mode when a confirmation operation in response to the optimization prompt message is detected.

Determining whether camera shake is present in response to the operation of pressing the shutter of the photographing device includes: acquiring a camera shake amplitude of the photographing device via a configured sensor in response to the operation of pressing the shutter of the photographing device; determining whether the camera shake amplitude is greater than a predetermined amplitude; and determining that camera shake is present when the camera shake amplitude is greater than the predetermined amplitude.

Determining whether camera shake is present in response to the operation of pressing the shutter of the photographing device includes: acquiring a current shutter speed and a current focus of the photographing device in response to the operation of pressing the shutter of the photographing device; determining whether the shutter speed is greater than the reciprocal of the focus; and determining that camera shake is present when the shutter speed is greater than the reciprocal of the focus.

Determining whether camera shake is present in response to the operation of pressing the shutter of the photographing device includes: acquiring an acutance of a focus area in response to the operation of pressing the shutter of the photographing device; determining whether the acutance is less than a predetermined acutance; and determining that camera shake is present when the acutance is less than the predetermined acutance.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for photographing by a photographing device, comprising:
   acquiring a sharpness of a focus area in response to an operation of pressing a shutter of the photographing device;
   determining whether the sharpness is less than a predetermined sharpness; and
   determining that camera shake is present when the sharpness is less than the predetermined sharpness;
   displaying an optimization prompt message if camera shake is present;
   determining whether an automatic stabilization function is enabled when a confirmation operation in response to the optimization prompt message is detected;
   determining that a target configuration parameter comprises shutter speed, photosensitivity, and aperture value if the automatic stabilization function is enabled;
   reducing the shutter speed to a predetermined shutter speed;
   increasing the photosensitivity to a predetermined photosensitivity; and
   reducing the aperture value to a predetermined aperture value.

2. The method according to claim 1, wherein determining the target configuration parameter according to the current processing mode of the photographing device comprises:
   if an automatic stabilization function is not enabled, determining that the target configuration parameter is a parameter of the automatic stabilization function.

3. The method according to claim 2, wherein adjusting the target configuration parameter comprises:
   enabling the automatic stabilization function.

4. The method according to claim 1, wherein determining whether camera shake is present in response to the operation of pressing the shutter of the photographing device comprises:
   acquiring a camera shake amplitude of the photographing device via a configured sensor in response to the operation of pressing the shutter of the photographing device;
   determining whether the camera shake amplitude is greater than a predetermined amplitude; and
   determining that camera shake is present when the camera shake amplitude is greater than the predetermined amplitude.

5. The method according to claim 1, wherein determining whether camera shake is present in response to the operation of pressing the shutter of the photographing device comprises:
   acquiring a current shutter speed and a current focus of the photographing device in response to the operation of pressing the shutter of the photographing device;
   determining whether the shutter speed is greater than the reciprocal of the focus; and
   determining that camera shake is present when the shutter speed is greater than the reciprocal of the focus.

6. A photographing device, comprising:
   one or more processors; and
   a memory configured to store instructions executable by the processor,
   wherein the processors are configured to perform:
   acquiring a sharpness of a focus area in response to an operation of pressing a shutter of the photographing device;
   determining whether the sharpness is less than a predetermined sharpness; and
   determining that camera shake is present when the sharpness is less than the predetermined sharpness;
   displaying an optimization prompt message if camera shake is present;
   determining whether an automatic stabilization function is enabled when a confirmation operation in response to the optimization prompt message is detected;
   determining that a target configuration parameter comprises shutter speed, photosensitivity, and aperture value if the automatic stabilization function is enabled;
   reducing the shutter speed to a predetermined shutter speed;
   increasing the photosensitivity to a predetermined photosensitivity; and
   reducing the aperture value to a predetermined aperture value.

7. The device according to claim 6, wherein determining the target configuration parameter according to the current processing mode of the photographing device comprises:
   if an automatic stabilization function is not enabled, determining that the target configuration parameter is a parameter of the automatic stabilization function.

8. The device according to claim 7, wherein adjusting the target configuration parameter comprises:
   enabling the automatic stabilization function.

9. The device according to claim 6, wherein determining whether camera shake is present in response to the operation of pressing the shutter of the photographing device comprises:
   acquiring a camera shake amplitude of the photographing device via a configured sensor in response to the operation of pressing the shutter of the photographing device;
   determining whether the camera shake amplitude is greater than a predetermined amplitude; and
   determining that camera shake is present when the camera shake amplitude is greater than the predetermined amplitude.

10. The device according to claim 6, wherein determining whether camera shake is present in response to the operation of pressing the shutter of the photographing device comprises:
    acquiring a current shutter speed and a current focus of the photographing device in response to the operation of pressing the shutter of the photographing device;
    determining whether the shutter speed is greater than the reciprocal of the focus; and
    determining that camera shake is present when the shutter speed is greater than the reciprocal of the focus.

11. A non-transitory computer-readable storage medium having stored therein instructions that, when executed by one or more processors of a photographing device, cause the photographing device to perform:
    acquiring a sharpness of a focus area in response to an operation of pressing a shutter of the photographing device;
    determining whether the sharpness is less than a predetermined sharpness; and
    determining that camera shake is present when the sharpness is less than the predetermined sharpness;
    displaying an optimization prompt message if camera shake is present;
    determining whether an automatic stabilization function is enabled when a confirmation operation in response to the optimization prompt message is detected;

determining that a target configuration parameter comprises shutter speed, photosensitivity, and aperture value if the automatic stabilization function is enabled;

reducing the shutter speed to a predetermined shutter speed;

increasing the photosensitivity to a predetermined photosensitivity; and reducing the aperture value to a predetermined aperture value.

* * * * *